United States Patent [19]
Takino et al.

[11] Patent Number: 5,302,636
[45] Date of Patent: Apr. 12, 1994

[54] RUBBER COMPOSITION

[75] Inventors: Hiroshi Takino, Ibaraki; Makoto Komai, Itami; Riichiro Ohara, Suita; Satoshi Iwama, Takatsuki; Yuji Yamaguchi, Osaka; Rinichi Nakayama, Takatsuki; Koji Hiramatsu, Osaka; Kenji Komamizu, Ibaraki, all of Japan

[73] Assignee: Toyo Tire & Rubber Company Limited, Osaka, Japan

[21] Appl. No.: 940,755

[22] Filed: Sep. 8, 1992

Related U.S. Application Data

[63] Continuation of Ser. No. 684,519, Apr. 15, 1991, abandoned, which is a continuation of Ser. No. 482,480, Feb. 21, 1990, abandoned.

[30] Foreign Application Priority Data

| Feb. 21, 1989 | [JP] | Japan | 1-42085 |
| Feb. 21, 1989 | [JP] | Japan | 1-42086 |
| Mar. 1, 1989 | [JP] | Japan | 1-49674 |
| Mar. 1, 1989 | [JP] | Japan | 1-49675 |

[51] Int. Cl.$^5$ .............................. C08L 89/06
[52] U.S. Cl. ..................... 524/11; 524/575
[58] Field of Search ................... 524/11, 575

[56] References Cited

U.S. PATENT DOCUMENTS

| 719,293 | 1/1903 | Arcouet | 524/11 |
| 2,643,234 | 6/1953 | Backus | 524/11 |
| 4,786,680 | 11/1988 | Suzuki et al. | 525/213 |
| 4,822,844 | 4/1989 | Kawakami et al. | 525/237 |
| 4,834,762 | 5/1989 | Nishibori | 524/11 |
| 4,857,571 | 8/1989 | Reiter et al. | 525/303 |

FOREIGN PATENT DOCUMENTS

| 63-178150 | 7/1988 | Japan | 524/11 |
| 1-306446 | 12/1989 | Japan | 524/11 |

Primary Examiner—John C. Bleutge
Assistant Examiner—Mark Sweet
Attorney, Agent, or Firm—Armstrong, Westerman, Hattori, McLeland & Naughton

[57] ABSTRACT

The present invention provides a rubber composition containing a leather powder or gelatin powder, and a tire having a tread prepared from the rubber composition.

3 Claims, No Drawings

RUBBER COMPOSITION

This application is a continuation of application Ser. No. 684,519 filed Apr. 15, 1991, now abandoned which is a continuation of application Ser. No. 482,480 filed Feb. 21, 1990, now abandoned.

The present invention relates to rubber compositions and tires suitable for use on common paved roads, especially on iced roads and snow-covered roads.

Studded tires having studs implanted in the tread are generally in wide use for driving motor vehicles on iced roads, whereas the use of studded tires gives off noises and causes damage to road surfaces to entail production and suspension of dust particles, posing a serious social problem in recent years. Accordingly, studless winter tires have come to be used even on iced roads. Studless tires, however, have problems in respect of abrasion resistance and heat generating property.

Although it has been proposed to admix short fibers with rubber, the mixture is unfavorable with respect to abrasion resistance and durability. It is also practice to admix common salt with tread rubber to form cells therein, but the presence of common salt entails the drawback of causing corrosion to the steel cords. Foam rubber can be prepared with use of an organic or inorganic blowing agent, whereas it is extremely difficult to control foaming in connection with the vulcanizing velocity, temperature and viscosity of rubber, vulcanizing pressure, etc.

An object of the present invention is to provide a rubber composition useful for tires and soles suited for use on iced roads and snow-covered roads.

Another object of the invention is to provide a tire having abrasion resistance on usual roads and exhibiting improved anti-skid performance on ice and snow.

The present invention provides a rubber composition which contains a material obtained from a leather.

The present invention provides a rubber composition characterized in that the composition has a leather powder incorporated therein.

The invention further provides a rubber composition characterized in that the composition comprises a gelatin powder less than 500 $\mu$m in mean particle size.

The invention further provides a tire characterized in that the tire has a tread made of a vulcanized rubber having cells up to 0.7 in mean aspect ratio, the rubber being prepared from a rubber composition comprising gelatin.

The invention further provides a studless winter tire characterized in that the tire has a tread prepared from a rubber composition containing a leather powder, the leather powder comprising a reticular and/or a papillary layer having a hierarchical structure of fibers of collagen protein.

Leathers consist primarily of collagen protein which is a natural high-molecular-weight substance. Collagen protein inherently has good superlow-temperature characteristics, and the molecules thereof have unique and complex micro- and macro-structures. These features and the ecology of vertebrates in cold climates appear to indicate that collagen protein has high friction characteristics on ice.

Accordingly, we have made intensive investigations to find whether it is possible to prepare from leather and rubber a rubberlike viscoelastic composite material having an excellent braking property on ice. No art has ever been explored in the past from such a viewpoint.

Gelatin has high ability to absorb and release moisture, for example, because the molecule has hydrophilic groups and hydrophobic groups as suitably distributed therein.

Accordingly, we have made intensive investigations to find whether it is possible to prepare from gelatin and rubber a rubberlike elastic composite material having an excellent anti-skid property on ice. No art has ever been explored in the past from such a viewpoint.

The rubber component of the rubber compositions or the treads of the tires of the present invention to be used can be natural rubber (N R), butadiene rubber (B R), styrene-butadiene rubber (S B R), isoprene rubber (I R), butyl rubber (I I R) or a blend of such rubbers.

As a first feature of the present invention, the invention provides a rubber composition which has a leather powder incorporated therein. While various leather powders are usable, desirable leather powders are those obtained from leather of oxen or cows, horses, swine, goats, sheep, etc. Preferably, the leather powder has a water content of less than 25 wt. %, more preferably about 3 to about 20 wt. %. The amount of leather powder to be incorporated is generally preferably about 3 to about 50 parts (by weight, the same as hereinafter), more preferably about 5 to about 30 parts, per 100 parts of the rubber component.

The leather powder is preferably up to 300 $\mu$m, more preferably in the range of about 1 to about 100 $\mu$m, in mean particle size. If over 300 $\mu$m in mean particle size, the leather powder becomes somewhat diminished in dispersibility in rubber composition, surface area of particle and reinforcing property.

As a second feature of the present invention, the invention provides a rubber composition comprising gelatin. The gelatin is preferably less than 500 $\mu$m, more preferably in the range of about 20 to about 450 $\mu$m, in mean particle size. If the particle size is not smaller than 500 $\mu$m, the resulting vulcanized rubber exhibits slightly improved anti-skid property on ice but impaired abrasion resistance. The amount of gelatin to be added is generally preferably about 3 to about 50 parts, more preferably about 5 to about 40 parts, per 100 parts of the rubber component.

When gelatin is compounded with rubber to physically and chemically prepare a composite material, the outstanding low-temperature characteristics of the gelatin as a natural high-molecular-weight substance serves to diminish the increase in the hardness of the rubber composition at low temperatures, giving an improved coefficient of friction at low temperatures. When such a rubber composition is used for tire treads and soles, the treads and soles exhibit an improved coefficient of friction especially in the presence of a quasi-liquid layer on ice around $-5°$ C.

As a third feature of the present invention, the invention provides a foam rubber tire which is made of a composite material of rubber and gelatin as a natural high-function high-molecular-weight substance and which has microporous open cells along with a characteristic structure formed by a reaction at the rubber-gelatin interface. It appears that when a mixture of rubber and gelatin is subjected to a vulcanization reaction, the gelatin becomes partially denatured at a high temperature to form microporous open cells. Further gelatin has high ability to absorb and release moisture since it has hydrophilic groups and hydrophobic groups in the molecule. Because of these characteristics, the water film present between the tire tread and ice is rapidly removed by cells and an ionic surface activity to afford greater friction between the tread and the iced or snow-covered road surface.

With the tire of the present invention, the mean particle size and the amount of gelatin to be used are each the same as the corresponding value of the rubber composition according to the second feature of the invention. The cells obtained are up to 0.7 in mean aspect ratio (short axis/long axis ratio). The aspect ratio was determined by photographing a cut section of the tread rubber of a test tire under an optical microscope at a magnification of about X300, measuring the lengths of short axis and long axis of about 100 cells and calculating the arithmetic mean of aspect ratios of these cells. If the aspect ratio exceeds 0.7, the tire will not exhibit fully improved anti-skid performance on ice and snow.

As a fourth feature of the present invention, the invention provides a tire the tread of which is prepared from a rubber composition containing a leather powder, the leather comprising a reticular layer and/or papillary layer having a hierarchical structure of fibers of collagen protein. While various leathers are usable, preferable are those obtained, for example, from oxen or cows, horses, swine, sheep, goats or the like. The leather to be used in the invention is the reticular layer and/or the papillary layer of a leather. The leather may have the epidermis, which however is preferably absent. Generally, the leather powder is used preferably in an amount of about 3 to about 50 parts, more preferably about 5 to about 30 parts, per 100 parts of the rubber.

The papillary layer and reticular layer which form a major portion of leather consist primarily of collagen protein of amino acid groups. This protein has a hierarchical structure of high complexity. Collagen has a molecular weight of about 300,000, and the molecule thereof is in the form of a slender rod about 3000 angstroms in length and about 15 angstroms in diameter. Such molecules regularly collect together into a microfibril, and microfibrils collect together, with covalent cross-links formed within and between molecules of collagen, to make up an insoluble fibril. Fibrils gather together into a fiber which can be observed under an optical microscope. Fibers gather into a bundle of fibers. Fibrils are as small as 50 to 200 nm in diameter, while bundles of fibers are up to about 500 $\mu$m in diameter. Thus, leather has a complex hierarchical structure. With the tire of the present invention, collagen protein is incorporated into the thread rubber to thereby form minute undulations on the thread surface. Although collagen protein consists essentially of superfine fibers, the hierarchical structure thereof diminishes the orientation of the fibers during molding and vulcanization of rubber, permitting the protein to retain flexibility and giving a satisfactory coefficient of friction to the tread on ice and snow. Further because collagen protein retains flexibility even at low temperatures and exhibits a hydrophilic effect due to amino acid groups, the presence of the protein enables the tire to retain a frictional force on frozen roads more effectively than when common synthetic fibers are incorporated therein.

According to the present invention, it is of course possible to add to the rubber compositions known vulcanizing agents, vulcanization accelerators, auxiliary vulcanization accelerators, vulcanization retardants, reinforcing agents, fillers, antioxidants, tackifiers, coloring agents and the like. Examples of useful fillers are carbon black, silica, clay, calcium carbonate and the like. Such known fillers are used in an amount of 20 to 150 parts, preferably 30 to 100 parts, per 100 parts of the rubber.

The rubber compositions of the present invention can be prepared by compounding together the foregoing components with a usual device, such as rolls, Banbury mixer or kneader.

The tire of the present invention can be produced by the usual method using the above rubber composition for the tread portion.

The rubber compositions of the invention have excellent low-temperature characteristics and are especially suited for use on iced roads and snow-covered roads.

The tires of the invention have high abrasion resistance and excellent low-temperature characteristics and suited especially for use on iced roads and snow-covered roads.

The present invention will be described with reference to the following examples and comparative examples, in which the parts are all by weight.

EXAMPLE A AND COMPARATIVE EXAMPLE A

Rubbers (100 parts) listed in Table 1, specified amounts of carbon black N339 and leather powder, 50 parts of naphthenic oil, 3 parts of zinc oxide, 2 parts of stearic acid, 1 part of antioxidant [Santoflex 13, N-(1,3-dimethylbutyl)-N'-phenyl-p-phenylenediamine], 1 part of paraffin wax, 1.4 parts of vulcanization accelerator (CBS, N-cyclohexyl-2-benzothiazylsulfenamide) and 2 parts of sulfur were fully compounded together in a Banbury mixer for 4 minutes to obtain a rubber composition, which was then vulcanized in a mold at 160° C. for 20 minutes. The hardness of the composition was measured at $-15°$ C. and 23° C. according to ASTM D2228. The difference between the two values is expressed as $\Delta$hardness. The smaller the value, the better are the low-temperature characteristics. The anti-skid property on ice was measured at $-5°$ C. and $-15°$ C. using a portable skid resistance tester, product of Stanley London. The property is expressed in terms of an index relative to the anti-skid property of Rubber Composition No. 14 which is taken as 100. The higher the value, the better is the anti-skid property on ice. The BR used was high cis content BR, and the SBR was solution-polymerized SBR having a styrene content of 10%. Table 1 shows the results. Compositions No. 1 to No. 11 are examples of the invention, and the others are comparative examples.

TABLE 1

| Composition No. | Example | | | | | | | |
|---|---|---|---|---|---|---|---|---|
| | 1 | 2 | 3 | 4 | 5 | 6 | 7 | 8 |
| Rubber component (part) | NR70 BR30 | NR70 BR30 | NR70 BR30 | NR70 BR30 | NR70 BR30 | SBR100 | NR70 BR30 | NR70 BR30 |
| Carbon black (part) | 50 | 50 | 50 | 50 | 50 | 50 | 50 | 50 |
| Leather powder | | | | | | | | |
| water content (wt %) | 6 | 13 | 20 | 13 | 13 | 13 | 13 | 13 |
| particle size ($\mu$m) | 100 | 100 | 100 | 50 | 200 | 100 | 100 | 300 |
| amount (part) | 30 | 30 | 30 | 30 | 30 | 30 | 30 | 30 |

TABLE 1-continued

| | | | | | | | | |
|---|---|---|---|---|---|---|---|---|
| Low-temperature characteristics | | | | | | | | |
| Δhardness (−15° C.~−23° C.) | 5 | 5 | 6 | 5 | 5 | 4 | 5 | 6 |
| Skid property on ice (Index) | | | | | | | | |
| −5° C. | 119 | 115 | 110 | 118 | 115 | 118 | 117 | 110 |
| −15° C. | 121 | 117 | 113 | 120 | 116 | 118 | 118 | 110 |

| | Example | | | Comparative example | | | |
|---|---|---|---|---|---|---|---|
| Composition No. | 9 | 10 | 11 | 12 | 13 | 14 | 15 |
| Rubber component (part) | NR70 BR30 | SBR100 | NR70 BR30 | NR70 BR30 | NR70 BR30 | NR70 BR30 | SBR100 |
| Carbon black (part) | 60 | 50 | 40 | 50 | 50 | 70 | 70 |
| Leather powder | | | | | | | |
| water content (wt %) | 13 | 13 | 13 | 25 | 32 | — | — |
| particle size (μm) | 100 | 100 | 100 | 100 | >300 | — | — |
| amount (part) | 5 | 15 | 45 | 30 | 30 | — | — |
| Low-temperature characteristics | | | | | | | |
| Δhardness (−15° C.~−23° C.) | 5 | 5 | 5 | 7 | no curing with heat | 7 | 7 |
| Skid property on ice (Index) | | | | | | | |
| −5° C. | 115 | 115 | 118 | 100 | | 100 | 101 |
| −15° C. | 116 | 118 | 120 | 98 | | 100 | 100 |

EXAMPLE B AND COMPARATIVE EXAMPLE B

Experiments were conducted in the same manner as in Example A with the exception of using 100 parts of rubber listed in Table 2, 70 parts of carbon black N339, a specified amount of gelatin powder, 50 parts of naphthenic oil, 3 parts of zinc oxide, 2 parts of stearic acid, 1 part of antioxidant [Santoflex 13], 1 part of paraffin wax, 1.4 parts of vulcanization accelerator (CBS) and 2 parts of sulfur. The skid property is expressed in terms of an index relative to that of Composition No. 24 which is taken as 100. The BR used was high cis content BR, and the SBR was solution-polymerized SBR having a styrene content of 10%. Table 2 shows the results. Compositions No. 16 to No. 22 are examples of the invention, and the others are comparative example.

gelatin was used for Composition No. 33. A blowing agent (dinitrosopentamethylenetetramine) was used in place of gelatin for Composition No. 34.

The rubber composition obtained was vulcanized in a mold at 160° C. for 20 minutes. The hardness was measured at −5° C. according to ASTM D2228. To determine the braking property on ice, the tire (size 165/80R13) was driven at a speed of 40 km/hr on an iced road and then locked, and the distance the tire traveled until it came to a stop after locking was measured. The property is expressed in terms of the reciprocal of the measured distance relative to the corresponding reciprocal obtained with Composition No. 33 and taken as 100. The greater the value, the better is the braking property on ice. The braking property on snow was determined by testing the tire on snow in the same

TABLE 2

| | Example | | | | | | | Comparative example | | |
|---|---|---|---|---|---|---|---|---|---|---|
| Composition No. | 16 | 17 | 18 | 19 | 20 | 21 | 22 | 23 | 24 | 25 |
| Rubber component (part) | NR70 BR30 | NR70 BR30 | NR70 BR30 | NR70 BR30 | NR70 BR30 | NR70 BR30 | SBR100 | NR70 BR30 | NR70 BR30 | SBR100 |
| Carbon black (part) | 70 | 70 | 70 | 70 | 70 | 70 | 70 | 70 | 70 | 70 |
| Gelatin | | | | | | | | | | |
| particle size (μm) | 250 | 250 | 250 | 50 | 350 | 430 | 250 | 590 | — | — |
| amount (part) | 15 | 30 | 40 | 15 | 15 | 15 | 15 | 15 | — | — |
| Low-temperature characteristics | | | | | | | | | | |
| Δhardness (−15° C.~−23° C.) | 5 | 4 | 4 | 4 | 5 | 5 | 4 | 6 | 7 | 7 |
| Skid property on ice (Index) | | | | | | | | | | |
| −5° C. | 111 | 115 | 118 | 117 | 110 | 109 | 110 | 104 | 100 | 101 |
| −15° C. | 109 | 112 | 114 | 114 | 107 | 106 | 107 | 103 | 100 | 100 |

EXAMPLE C AND COMPARATIVE EXAMPLE C

A rubber composition was prepared from 100 parts of rubber(s) listed in Table 3, specified amounts of carbon black N339, gelatin and naphthenic oil, 3 parts of zinc oxide, 2 parts of stearic acid, 2 parts of antioxidant [Santoflex 13], 1 part of paraffin wax, 1.7 parts of vulcanization accelerator (CBS) and 1.7 parts of sulfur, by fully mixing these ingredients in a Banbury mixer for 4 minutes. Tires of the size 165/80R13 are produced by the usual method using the composition for the tread. No manner as above. To determine the wear, the amount of abrasion resulting from running 10,000 km was measured. The value is expressed in terms of an index relative to the corresponding value obtained by the tire with Composition No. 33 and taken as 100. The greater the index, the greater is the wear resistance. The BR used was high cis content BR, and the SBR was solution-polymerized SBR having a styrene content of 18%. Table 3 shows the results. Compositions No. 26 to No. 32 are examples of the invention, and the others are comparative examples.

TABLE 3

| Composition No. | Example | | | | | | | Comparative example | |
|---|---|---|---|---|---|---|---|---|---|
| | 26 | 27 | 28 | 29 | 30 | 31 | 32 | 33 | 34 |
| Rubber component (part) | NR70 BR30 | NR70 BR30 | NR70 BR30 | NR70 BR30 | NR70 BR30 | NR70 BR30 | SBR100 | NR70 BR30 | SBR100 |
| Carbon black (part) | 70 | 70 | 70 | 60 | 60 | 60 | 70 | 70 | 80 |
| Naphthenic oil (part) | 35 | 35 | 35 | 40 | 40 | 40 | 55 | 30 | 35 |
| Gelatin (part) | 10 | 15 | 20 | 40 | 45 | 50 | 20 | — | — |
| Blowing agent (part) | — | — | — | — | — | — | — | — | 8 |
| Aspect ratio of cell | 0.63 | 0.39 | 0.34 | 0.22 | 0.17 | 0.11 | 0.35 | — | 0.82 |
| Hardness (−5° C.) | 60 | 60 | 61 | 62 | 62 | 63 | 60 | 60 | 60 |
| Braking property on ice (Index) | 109 | 109 | 111 | 117 | 120 | 121 | 113 | 100 | 102 |
| Braking property on snow (Index) | 108 | 108 | 109 | 116 | 119 | 121 | 112 | 100 | 101 |
| Wear index | 98 | 98 | 97 | 95 | 94 | 94 | 97 | 100 | 96 |

EXAMPLE D AND COMPARATIVE EXAMPLE D

A rubber composition was prepared from 100 parts of rubber(s) listed in Table 4, specified amounts of carbon black N339 and fibers or pulp of leather reticulation or nylon fibers, 50 parts of naphthenic oil, 3 parts of zinc oxide, 2 parts of stearic acid, 1 part of antioxidant [Santoflex 13], 1 part of paraffin wax, 1.4 parts of vulcanization accelerator (CBS) and 2 parts of sulfur, by fully mixing these ingredients in a Banbury mixer for 4 minutes. Studless tires of the size 165SR13 were produced by the usual method using the composition for the tread.

The rubber composition obtained was vulcanized in a mold at 160° C. for 20 minutes. The hardness of the composition was measured at −15° C. and 23° C. according to ASTM D2228, and the difference between the two values is expressed as Δ hardness. The smaller the value, the better are the low-temperature characteristics. To determine the braking property on ice, the tire (size 165SR13) was driven at a speed of 40 km/hr on an iced road and then locked, and the distance the tire traveled until it came to a stop after locking was measured. The property is expressed in terms of the reciprocal of the measured distance relative to the corresponding reciprocal obtained with Composition No. 41 and taken as 100. The greater the value, the better is the braking property on ice. The BR used was high cis content BR, and the SBR was solution-polymerized SBR having a styrene content of 10%. Table 4 shows the results. Compositions No. 35 to No. 40 are examples of the invention, and the others are comparative examples.

TABLE 4

| Composition No. | Example | | | | | | Comparative example | | | |
|---|---|---|---|---|---|---|---|---|---|---|
| | 35 | 36 | 37 | 38 | 39 | 40 | 41 | 42 | 43 | 44 |
| Rubber component (part) | NR70 BR30 | SBR100 | NR70 BR30 | NR70 BR30 | SBR100 | NR70 BR30 | NR70 BR30 | SBR100 | NR70 BR30 | NR70 BR30 |
| Carbon black (part) | 50 | 50 | 70 | 60 | 50 | 40 | 70 | 70 | 30 | 50 |
| Leather material (part) | leather fiber 30 | leather fiber 30 | leather fiber 30 | leather fiber 5 | leather fiber 15 | leather fiber 45 | — | — | Aramide pulp 30 | Nylon fiber 30 |
| Low-temperature characteristics Δhardness (−15° C.∼−23° C.) | 5 | 4 | 5 | 5 | 5 | 5 | 7 | 7 | 6 | 6 |
| Skid property on ice (Index) | 116 | 118 | 109 | 106 | 122 | 120 | 100 | 101 | 90 | 95 |

We claim:

1. A rubber composition for a skid-resistant tire tread which comprises a sulfur-vulcanized, solution-polymerized, styrene-butadiene rubber having a styrene content of up to 18% having incorporated therein 3 to 50 parts by weight of a leather powder having a mean particle size of up to 300 μm, and 30 to 100 parts by weight of carbon black per 100 parts of the rubber, said rubber composition having a Δ hardness according to ASTM D2228 of 4–6 when measured at −15° C. and 23° C.

2. A rubber composition according to claim 1, wherein the leather powder has a mean particle size of 1 to 100 μm.

3. A rubber composition according to claim 1, wherein 5 to 30 parts by weight of the leather powder are incorporated in 100 parts of the rubber.

* * * * *